June 19, 1956     B. H. SHORT ET AL     2,751,464

TEMPERATURE RESPONSIVE SWITCH

Filed July 2, 1953

INVENTOR.
Brooks H. Short and
George B. Shaw
BY
*Their Attorney*

United States Patent Office 2,751,464
Patented June 19, 1956

2,751,464
TEMPERATURE RESPONSIVE SWITCH

Brooks H. Short and George B. Shaw, Anderson, Ind., assignors to General Motors Corporation, Detroit, Mich., a corporation of Delaware Application July 2, 1953, Serial No. 365,678

3 Claims. (Cl. 200—138)

This invention relates to temperature-responsive devices and more particularly to a thermostatic switch.

It is an object of the present invention to provide a temperature-responsive device that is calibrated to respond to a predetermined temperature for closing an electric circuit particularly in connection with remote controlled indicator systems. This object is accomplished by providing a temperature-responsive bimetallic element that is arranged to engage an adjustable contact for forming an electrical connection therewith when a portion of said element transfers heat from a metallic cup immersed in a media, the temperature of which is to be measured, so the shape of the element is changed and an arm portion thereof moves an integral contact portion for making or breaking contact with the adjustable contact element.

It is a further object of the present invention to provide a temperature-responsive element that is adapted to be mounted in the motor block of an automobile so as to open or close an electric circuit to a temperature-indicating device in response to a predetermined range of temperatures of a fluid contained in said engine. This object is materialized by providing an adjustable contact electrically insulated from a bimetallic temperature-responsive element having a portion thereof in contact with a metallic cup that is surrounded by the engine fluid so that at a predetermined temperature, an arm portion of the bimetallic element will move an integral contact portion formed thereon into and out of contact with an adjustable contact for opening or closing an electric circuit to the electric temperature-indicating device.

It is another object of the present invention to provide a unitary bimetallic element for use in a temperature-responsive device wherein a portion of the element is adapted to pass heat to a temperature-responsive section so a contact portion thereof will move in response to a predetermined temperature in contact with a dome shaped portion of an adjustable contact to close an electric circuit therebetween.

Further objects and advantages of the present invention will be apparent from the following description, reference being had to the accompanying drawings wherein a preferred embodiment of the present invention is clearly shown.

Figure 3:
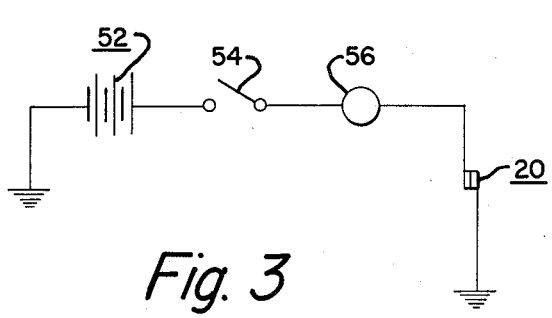

Fig. 3 schematically shows a wiring diagram wherein a temperature-responsive device is included.

Figure 1:
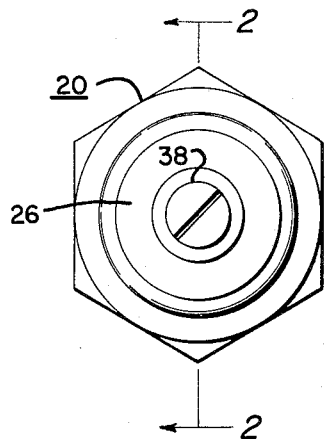
Fig. 1 is an end view of a temperature-responsive device.
Figure 4:
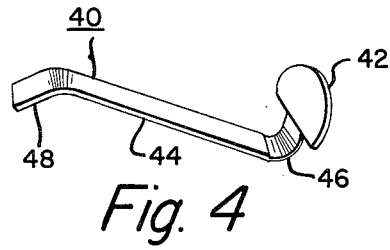

Fig. 4 in perspective shows a bimetallic element according to the present invention.

Figure 5:
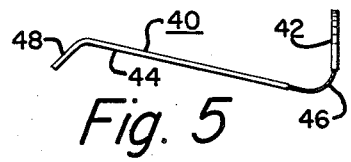

Fig. 5 shows a side view of a bimetallic element in Fig. 4.

Figure 6:
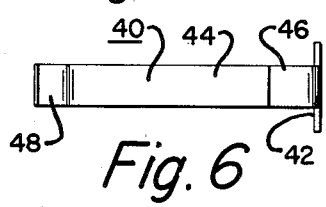

Fig. 6 is a plan view of the bimetallic element in Fig. 5.

Figure 2:
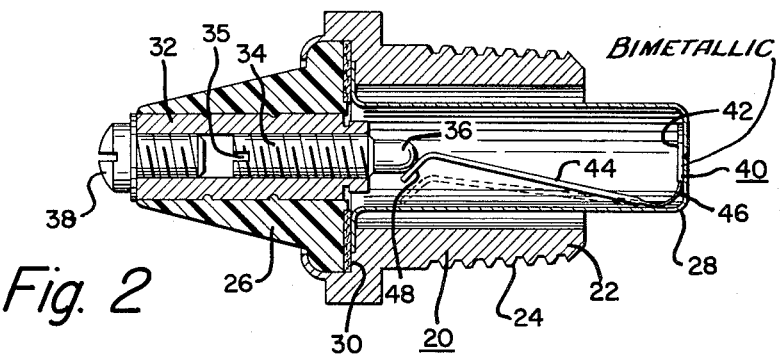
Fig. 2 is a view in section along line 2—2 in Fig. 1.

In the drawings and in Fig. 2 particularly, numeral 20 designates a temperature-responsive device that includes: a support member 22, having a threaded portion 24 adapted to engage a threaded opening in a fluid container (not shown); a metallic cylindrical cup-shaped member 28 surrounded by the fluid within the container; the cup-shaped member 28 has an open end portion sealed from an insulating member 26, also carried by support member 24, by means of a gasket 30; a metallic sleeve-like member 32, anchored in insulating member 26, that has a threaded internal bore wherein an adjustable contact 34 is received; and a temperature-responsive bimetallic element 40.

As clearly seen in the drawings, the adjustment of contact 34 is accomplished by inwardly or outwardly threading the contact 34 so that a dome shaped head portion 36 thereof is axially moved towards or away from the element 40. A terminal screw 38, adapted to be received in the threaded portion of member 32, is arranged so that an electrical connection may be made thereto. A screw driver slot 35 is provided and is used to axially adjust member 34 which may be concealed by the terminal screw 38.

The bimetallic element 40 is a unitary element and has a base portion 42 suitably attached to the portion of cup-shaped member 28 that is remote from the contact dome 36 of the adjustable contact 34. This bimetallic element 40 has a curved temperature-responsive portion 46 connected to an arm portion 44 which moves a contact portion 48 that is formed substantially at a 45° angle with the arm portion 44. From the above arrangement of parts it is apparent the heat from the fluid when transferred through the container 28 to the base portion 42 will cause the shape of the curved portion 46 of the bimetallic element to be changed. This change of shape is amplified by the extending arm portion 44 so that when the temperature to be measured is less than a predetermined value, the bimetallic element 40 will have the shape as shown in dotted lines in Fig. 2, and when the temperature has reached a predetermined value, the contact portion 48 will be moved so as to engage a dome-shaped portion 36 of member 34 and thereby close an electrical circuit therebetween.

In Figs. 4, 5 and 6 the shape and arrangement of bimetallic element 40 is clearly shown wherein the material 50 forming the curved portion 46 of the bimetallic element has been reduced in thickness. This reduction is desirable in that the deflection of the element 42 in response to temperature changes is dependent upon the increase in length of the different metals that make up the element. Hence when the material is reduced at the curve 46 so that the maximum area of different metals is presented at the interface with the minimum value at the bent portion of the element 40, an increased sensitivity to temperature changes of the bimetallic element is achieved.

In Fig. 3 the inclusion of the temperature-responsive device 20 is shown in wire diagram wherein a battery 52 supplies current through a switch 54 to a signal light 56 when the temperature-responsive element 20 has the contact portions thereof closed in response to a predetermined temperature, so the current from the battery may pass through the temperature-responsive device as through sleeve 32, contact 34, bimetallic element 40, cup-shaped member 28, where it is grounded through support 22 to complete the circuit.

From the above arrangement of parts it is apparent that the shape and arrangement of the dome portion 36 and the contact portion 48 of the metallic element 40 is important to the success of the present invention. The shape of the dome 36 and contact 48 will permit the device to be calibrated to any desired temperature as when the adjustable contact screw 34 is axially moved in sleeve 32. Thus when the contact is in a remote position, a higher temperature will be required to move the arm portion 44 and to bring the contacting portion 48 into contact with the dome-shaped element 36 than when the contact 34 is adjustably threaded further into the sleeve member 32.

While the temperature-responsive device according to the present invention is particularly adapted for use in the measurement of fluid temperatures at various locations in an internal combustion engine, the device is also adapted to indicate a predetermined temperature in various other applications and with other fluids, if the metals of the bimetallic element are selected for temperature ranges involved or if the various parts are properly calibrated.

Further, the cup-shaped member 28 may be filled with a suitable fluid, such as oil, so as to decrease the probability of arcing between the contacts and to increase susceptibility of the device to temperature changes while dampening out vibrations to the bimetallic element.

While the embodiment of the present invention as herein disclosed, constitutes a preferred form, it is to be understood that other forms might be adopted.

What is claimed is as follows:

1. In a temperature indicating device adapted to close an electric circuit in response to a predetermined temperature having; a support, a metallic cup member carried by a support and adapted to be surrounded by a media of variable temperature and an electric contact carried by said support and having one end projecting into said metallic cup, a temperature responsive bimetallic element, comprising; an enlarged base portion attached to the portion of said cup member remote from said adjustable contact and secured in heat and electrical conducting relation with said cup; a curved portion having a thickness less than the remaining portions of said bimetallic element integrally formed therewith and adapted to have the shape thereof changed in response to the heat received from said base portion, a contact portion integrally formed on said element remote from said base portion and normally out of contact with the contact carried by said support, and an arm portion integrally formed with and connecting said curved portion with said contact portion and disposed substantially at a 45 degree angle from said contact portion and adapted to magnify and transmit the movement of said curved portion to said contact portion for moving said contact portion relative to said contact when said curved portion changes its shape in response to heat transmitted through the base portion from said cup member.

2. In a temperature responsive device adapted to close an electric circuit in response to a predetermined temperature having a support, a casing carried by said support surrounded by a media having a variable temperature, and a contact adjustably carried by said support and axially movable into said casing and electrically insulated therefrom, a temperature responsive bimetallic element positioned within said casing comprising; an enlarged base portion attached to the portion of said casing remote from said contact and in heat and electrical conducting relation with said casing, a curved portion having a thickness less than the remainder of said bimetallic element integrally formed therewith and adapted to have the shape thereof changed in response to heat received from said base portion, a contact portion integrally formed with said element and normally disposed out of engagement with said adjustable contact, and an arm portion integrally formed with and connecting said curved portion with said contact portion and adapted to magnify and transmit the movement of said curved portion to said contact portion when said curved portion changes its shape in response to heat transmitted to said base portion from said casing member.

3. A temperature responsive device adapted to close an electric circuit in response to a predetermined temperature, comprising in combination; a support, a casing carried by said support and surrounded by a variable temperature media, a contact adjustably carried support and having a portion thereof projecting into said metallic casing, a dome-shaped end on said projecting portion, and a temperature responsive bimetallic element positioned within and having one end attached to said casing, said bimetallic element comprising; an enlarged portion attached to the portion of the casing remote from said adjustable contact and in heat and electrical conducting relation with said casing, a curved portion having a thickness less than the remainder of said bimetallic element integrally formed with and adapted to have the shape thereof changed in response to heat received from said base portion, a contact portion integrally formed with said element normally disposed out of contact with the dome-shaped portion of said adjustable contact, and an arm portion integrally formed with and connecting said curved portion with said contact portion and adapted to magnify and transmit the movement of said curved portion to said contact portion when said curved portion changes its shape in response to heat transmitted through said base portion from said casing member.

References Cited in the file of this patent

UNITED STATES PATENTS

| | | |
|---|---|---|
| 156,242 | Watkins | Oct. 27, 1874 |
| 912,433 | Sparrow | Feb. 16, 1909 |
| 1,602,952 | Smith | Oct. 12, 1926 |
| 2,022,440 | Slough | Nov. 26, 1935 |
| 2,507,365 | Boddy | May 9, 1950 |